US006722187B2

(12) United States Patent
Grieve et al.

(10) Patent No.: US 6,722,187 B2
(45) Date of Patent: Apr. 20, 2004

(54) ENHANCED VACUUM DECAY DIAGNOSTIC AND INTEGRATION WITH PURGE FUNCTION

(76) Inventors: Malcolm James Grieve, 21 Wenlock Rd., Fairport, NY (US) 14450; Stephen F. Majkowski, 1205 Sandy Ridge, Rochester Hills, MI (US) 48306; Kenneth M. Simpson, 1315 Roberta Ct., Howell, MI (US) 48843; Michael J. Steckler, 3337 Kingsway Dr., Highland, MI (US) 48356; Carelton Williams, 10667 W. Ten Mile Rd., Oak Park, MI (US) 48237

( * ) Notice: Subject to any disclaimer, the term of this patent is extended or adjusted under 35 U.S.C. 154(b) by 26 days.

(21) Appl. No.: 09/884,496

(22) Filed: Jun. 18, 2001

(65) Prior Publication Data

US 2002/0005061 A1 Jan. 17, 2002

Related U.S. Application Data

(62) Division of application No. 09/487,062, filed on Jan. 19, 2000.

(51) Int. Cl.[7] .................................... G01M 3/04

(52) U.S. Cl. .................................... 73/49.7; 73/118.1

(58) Field of Search .................................... 73/40, 40.5 R, 73/49.7, 118.1; 123/520; 702/51

(56) References Cited

U.S. PATENT DOCUMENTS

| | | | | |
|---|---|---|---|---|
| 5,315,980 A | * | 5/1994 | Otsuka et al. | 123/520 |
| 5,349,935 A | * | 9/1994 | Mezger et al. | 123/520 |
| 5,398,661 A | * | 3/1995 | Denz et al. | 123/520 |
| 5,425,344 A | * | 6/1995 | Otsuka et al. | 123/520 |
| 5,499,614 A | * | 3/1996 | Busato et al. | 123/520 |
| 5,606,121 A | * | 2/1997 | Blomquist et al. | 73/118.1 |
| 5,678,523 A | * | 10/1997 | Hashimoto et al. | 123/520 |
| 5,730,107 A | * | 3/1998 | Blumenstock | 123/520 |
| 6,089,081 A | * | 7/2000 | Cook et al. | 73/118.1 |
| 6,213,102 B1 | * | 4/2001 | Isobe et al. | 123/520 |
| 6,334,355 B1 | * | 1/2002 | Grieve et al. | 73/49.7 |
| 6,363,921 B1 | * | 4/2002 | Cook et al. | 123/520 |

* cited by examiner

*Primary Examiner*—Helen Kwok
*Assistant Examiner*—Charles D Garber

(57) ABSTRACT

The present invention relates a method of detecting leaks and blockages in a fuel system. The leaks are detected using a RAMPOFF mode and a TANK mode. The RAMPOFF mode modifies the evaporative diagnostic purge logic to increase the ramp down rates of the evaporative purge duty cycle to aggressively shut off the purge solenoid valve for tests used to detect leaks as small as 0.02 inches in diameter. The TANK mode modifies the evaporative diagnostic purge logic to support aggressive purging requirements for tests used to detect larger leaks of greater than 0.04 inches in diameter. The MASS FLOW mode modifies the evaporative diagnostic purge logic to hold a constant purge mass flow rate necessary to detect blockages across a vent solenoid valve. The RAMPOFF mode, TANK mode, and MASS FLOW modes support evaporative diagnostics that are run continuously within a fuel system when acceptable engine operating conditions are present.

4 Claims, 5 Drawing Sheets

ENHANCED VACUUM DECAY DIAGNOSTIC AND INTEGRATION WITH PURGE FUNCTION

CROSS-REFERENCE TO RELATED APPLICATIONS

The present application is a divisional application of our application Ser. No. 09/487,062, filed Jan. 19, 2000.

TECHNICAL FIELD

The present invention relates to fuel systems in automotive vehicles. More specifically, this invention relates to a diagnostics system for detecting leaks in a fuel system for an automobile engine.

BACKGROUND

On-board diagnostics for detection of fuel system leaks have been required in the United States since Model Year 1996 by both the Environmental Protection Agency (EPA) and the California Air Resources Board (CARB). Leaks equivalent to a 0.040 inch (1 mm) diameter hole or greater anywhere in the fuel is system are currently required to be detected by the EPA, while CARB lowered the detection level requirements to 0.020-inch diameter holes for the Model Year 2000.

Two methods of leak detection have generally been used, namely, vacuum decay and pressure decay. Vacuum decay methods typically have a cost advantage over pressure based systems; however, vacuum decay methods have been thought to be deficient with respect to their ability to reliably detect 0.020 inch leaks.

One deficiency in previous vacuum-based evaporative leak diagnostic systems is that high purge rates required to evacuate the fuel tank at idle cannot be achieved. This is due to either insufficient fuel injector or integrator margins to allow the necessary purge rates.

Another deficiency in the prior systems is that the lower purge rates results in either longer idle times required to evacuate the fuel tank or in not being able to draw the required lank volume for certain types of fuel and leak combinations.

A third deficiency in prior systems diagnostics is that idle stability problems occurred when purge solenoid valves are closed for purge duty cycles which are greater than 10% to 40% at idle. The purge duty cycle is a software calculation that determines how long the purge solenoid valve is opened during one pass through the software.

SUMMARY OF THE INVENTION

It is therefore an object of the present invention to integrate an enhanced purge function algorithm into an enhanced vacuum decay diagnostic that compensates for these deficiencies by adding unique purge duty cycle rates and limits to allow for the higher amount of purge necessary to draw the required fuel/leak combinations and to allow for the higher purge duty cycle transient rates required to shut off purge when the tank vacuum target is reached to minimize vacuum overshoots.

To accomplish this, three purge modes (TANK, MASS FLOW, and RAMP OFF) are used to support the evaporative diagnostic. TANK mode modifies the purge logic to support the aggressive purging requirements of a Preset Large Leak Test, a Warm Large Leak Test, and an Idle Large Leak Test. MASS FLOW mode modifies the purge logic to hold a constant purge flow mass rate that is necessary during the Vent Blockage Test. RAMP OFF mode increases the ramp down rate of the purge duty cycle to aggressively shut off the purge value at the start of the Small and Very Small System Leak Tests and clamps purge off during the Purge Valve Leak Test.

In one aspect of the present invention, the evaporative diagnostic determines whether small or large leaks are present in the fuel system and whether the vent solenoid valve is blocked or partially blocked by performing tests using the three purge modes (RAMP OFF, TANK, and MASS FLOW) when certain engine operating conditions are present.

In a further aspect of the inventions the RAMP OFF mode is used in conjunction with the Small and Very Small Leak Tests to determine whether leaks as small as 0.02 inches in diameter are present in the fuel system. The test comprises the steps of determining whether a set of engine operating conditions is present; drawing a predetermined vacuum in the fuel system; sealing the fuel system; allowing the vacuum to decay for a predetermined amount of time; and indicating when said the pressure decay exceeds the predetermined vacuum decay threshold.

In a further aspect of the invention, the TANK mode is used in conjunction with the Warm, Preset and Idle Large Leak Tests to determine whether large leaks of greater than 0.04 inches in diameter are present in the fuel system. The test comprises the steps of determining whether a set of engine operating conditions is present; closing a vent solenoid valve; drawing a vacuum across the fuel system at a predetermined rate for a predetermined time; determining whether a vacuum pressure rise exceeds a predetermined vacuum rise threshold; or indicating when the vacuum pressure rise is less than the predetermined vacuum rise threshold within a predetermined time.

In a further aspect of the invention, the MASS FLOW mode is used to determine whether there is a blockage or partial blockage in the vent solenoid valve of the fuel system. The test comprises the steps of determining whether a set of engine operating conditions is present; opening the vent solenoid valve and a puree solenoid valve of the fuel system; purging the fuel system at a predetermined constant rate until a sufficient mass is purged; determining whether a vacuum pressure rise exceeds a predetermined vacuum rise threshold; or indicating when the vacuum pressure rise exceeds the predetermined vacuum rise threshold within a predetermined time.

Other objects and advantages of the present invention will become apparent upon considering the following detailed description and appended claims, and upon reference to the accompanying drawings.

DESCRIPTION OF THE PREFERRED EMBODIMENT(S)

Figure 1:
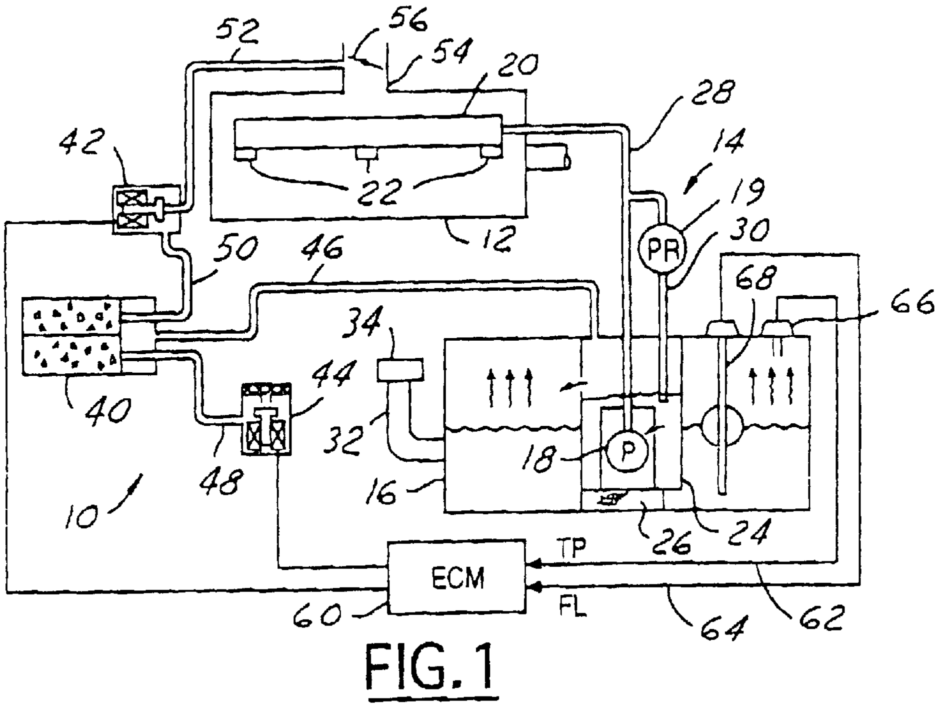
FIG. 1 is a diagram of an automotive evaporative emission system according to the invention, including a microprocessor-based engine control nodule (ECM)

Referring to FIG. 1, the reference numeral 10 generally designates an evaporative emission system for an automobile engine 12 and fuel system 14. The fuel system 14 includes a fuel tank 16, a fuel pump (P) 18, a pressure regulator (PR) 19, an engine fuel rail 20, and one or more fuel injectors 22. The fuel tank has an internal chamber 24, and the pump 18 draws fuel into the chamber 24 through a filter 26, as generally indicated by the arrows. Fuel (not shown) is supplied to the tank 16 via a conventional filler pipe 32 sealed by the removable fuel cap 34.

The evaporative emission system 10 includes a charcoal canister 40, a solenoid purge valve 42 and a solenoid air vent valve 44. The canister 40 is coupled to fuel tank 16 via line 46, to air vent valve 44 via line 48, and to purge valve 42 via line 50. The air vent valve 44 is normally open so that the canister 40 collects hydrocarbon vapor generated by the fuel in tank 16, and in subsequent engine operation, the normally closed purge valve 42 is modulated to draw the vapor out of the canister 40 via lines 50 and 52 for ingestion in engine 12. To this end, the line 52 couples with the purge valve 42 to the engine intake manifold 54 on the vacuum or downstream side of throttle 56.

The air vent valve 44 and purge valve 42 are both controlled by a microprocessor-based engine control module (ECM) 60, based on a number of input signals, including fuel tank pressure (FTP) on line 62 and fuel level (FL) on line 64. The fuel tank pressure is detected with a conventional pressure sensor 66 and the fuel level is detected with a conventional fuel level sensor 68. Of course, the ECM controls a host of engine related functions not listed herein.

In general, the ECM 60 diagnoses leaks in the evaporative emission system 10 by suitably activating the solenoid purge valves 42 and solenoid air vent valve 44, and monitoring fuel tank pressure (FTP). As vacuums are drawn across the evaporative system due to the opening and closing of valves 42 and 44, pressure increases may be monitored by the ECM 60. If an unusual pressure increase or decrease is detected, the ECM 60 will indicate a leak or blockage.

Figure 2A:
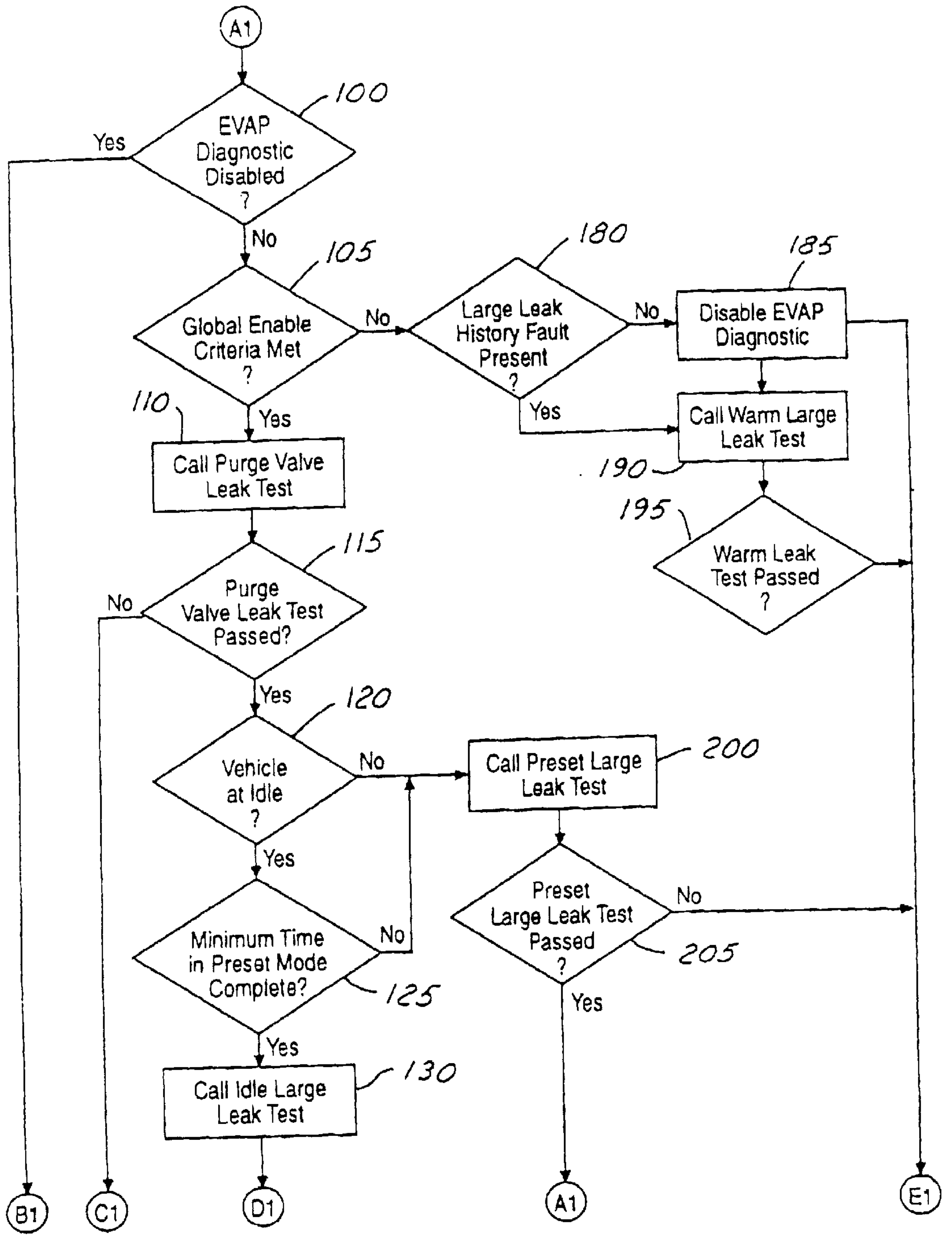
FIG. 2 is a logic flow diagram for an evaporative system diagnostic.
Figure 2B:
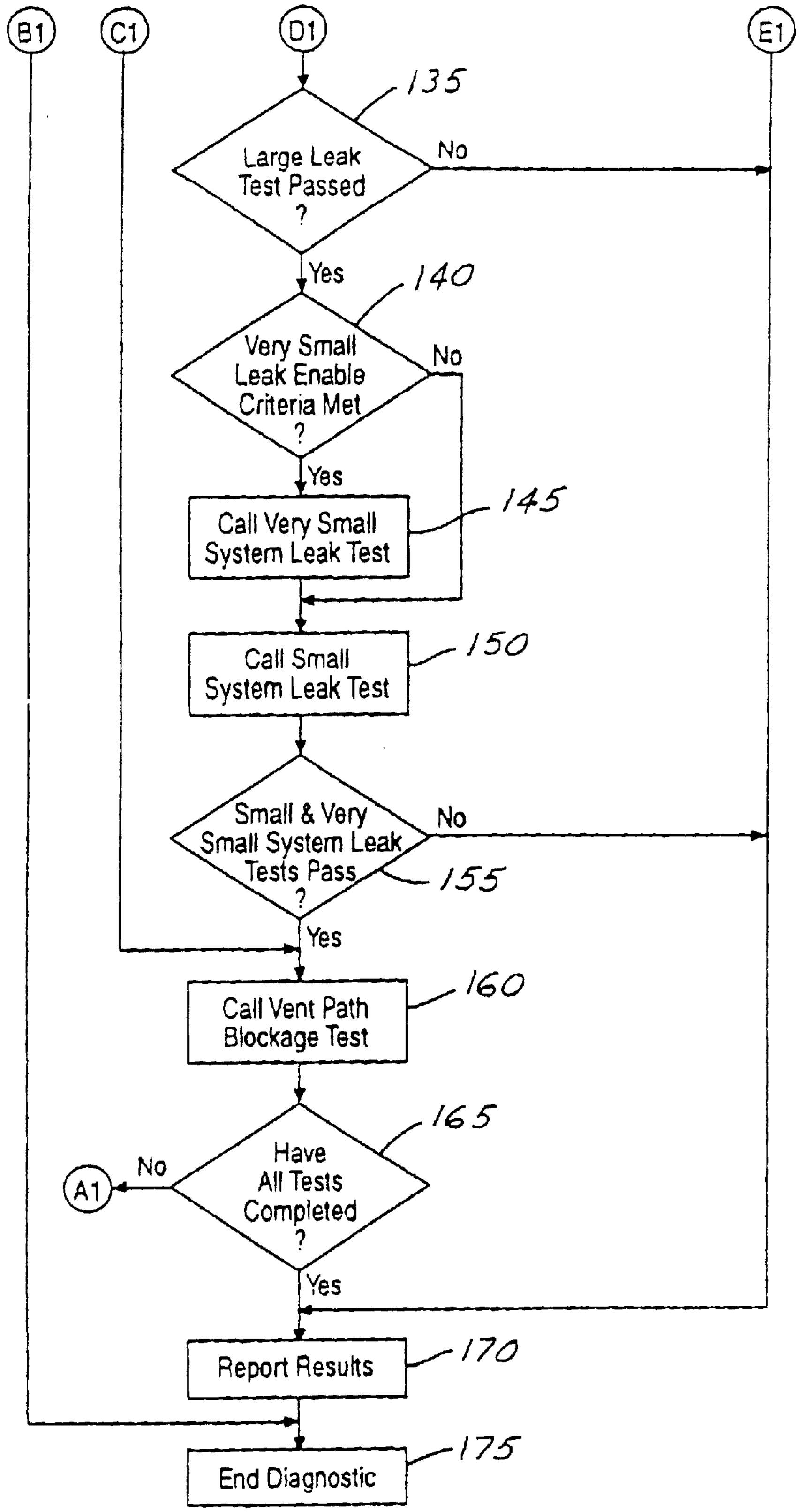

Referring now to FIG. 2, a global evaporative system diagnostic routine for detecting leaks in evaporative emissions systems is illustrated. To begin the routine, Step 100 determines whether the evaporative diagnostic is disabled. If it is not disabled, Step 105 determines whether the global enablement criteria are met. The global enablement criterion determines by inference fuel or vapor temperature, which affects vapor levels in the fuel system, by using reliable predictors. These predictors may include determining whether the fuel level, coolant level, intake temperature, coolant-intake delta temperature, tank hydrocarbon vapor levels, and barometric pressure are within an acceptable range. In addition, the diagnostic may be disabled by the diagnostic manager (through the ECM 60) for vehicle applications which do not require this evaporative diagnostic.

If the criteria are met, Step 110 calls the Purge Valve Leak Test and Step 115 is executed. In Step 115, a determination is made whether the Purge Valve Leak Test is passed. The Purge Valve Leak Test invokes RAMP OFF mode in the purge logic. The Purge Valve Leak Test closes both the purge and vent valves to test for leaks across the purge valve. A leak will be indicated if the tank vacuum exceeds a predetermined vacuum threshold in the allotted time. The allotted time is based the available manifold vacuum. If the manifold vacuum is large, the test runs quickly. If the manifold vacuum is low, the test runs slower. The details of the Purge Valve Leak Test of Steps 110 and 105 are discussed in more detail in copending U.S. patent application Ser. No. 09/437,661 and are incorporated by reference herein.

If the Purge Valve Leak Test of Step 115 is passed, Step 120 is executed. Step 120 determines whether the vehicle is in idle mode. If the vehicle is in idle mode, Step 125 is executed.

In Step 125, a determination is made as to whether the vehicle has completed the minimum time in the Preset Mode. The minimum time feature functions to ensure that the fuel lank would be under a vacuum for a predetermined time before proceeding so that vapor content in the tank yields more accurate results. If the minimum time in Preset Mode is completed, the Idle Large Leak Test of Step 130 is called and Step 135 is executed.

Step 135 determines whether the Idle Large Leak Test has passed. The Idle Large Leak Test invokes TANK mode in the purge logic. The Idle Large Leak Test runs when the engine is at idle and the vehicle is stationary. The test will fail if there is an inability to draw a vacuum in the tank above a predetermined threshold within a certain allotted time when the vent valve is closed and TANK mode is in operation. If the Idle Large Leak Test has passed, Step 140 is executed.

In Step 140, it is determined whether the Very Small Leak Test enablement criteria are met. The enablement criteria for the Very Small Leak Test are whether the fuel level, coolant temperature, intake temperature, and coolant-intake delta temperature are within an acceptable range. If the enablement criteria are met, the Very Small Leak Test is called in Step 145 and Step 150 is executed. If the enablement criteria are not met in Step 140, Step 150 is executed without performing Step 145. In Step 150, the Small Leak Test is called.

After Step 150, Step 155 is executed. Step 155 determines whether the Small and Very Small Leak Test are passed. In Step 155, the Small and Very Small Leak Tests invoke the RAMP OFF purge mode in the purge logic as described in Step 115 with different predetermined vacuum thresholds in the allotted time. If Step 155 indicates that these tests were passed, the Vent Blockage Test in Step 160 is called and executed.

In Step 160, a determination is made as to whether there is a blockage in the vent path using the Vent Path Blockage Test. Vent solenoid blockages will cause the fuel tank vacuum level to rise during a normal purge. The Vent Blockage Test invokes the MASS FLOW purge mode in the purge logic to determine a pass or fail. In the MASS FLOW purge mode, the purge solenoid valve 42 and vent solenoid valve 44 are commanded open. Purge mass flow is limited to a maximum value. If tank vacuum rises above a threshold value, the test will fail. If sufficient mass is purged without a rise in tank vacuum, the test will pass. The MASS FLOW mode alters the purge logic to hold a constant purge mass flow rate within the evaporative system during the test cycle After Step 160, Step 165 is executed. Step 165 determines whether all tests of evaporative diagnostic have been completed. If all of the tests have been completed, Step 170 is executed, where a report of all the results is stored. From Step 170, the diagnostic ends in Step 175.

Referring back to Step 100, if the evaporative diagnostic is disabled, Step 175 is executed, where the diagnostic as described above is ended.

Referring back to Step 105, if the global criterion are not met, Step 180 is executed. In Step 180, a determination is made as to whether a Large Leak History Fault is present.

The Large Leak History Fault is present when a leak greater than 0.04" has been detected within the last three key cycles. If the Large Leak History Fault is not present, the Evaporative Diagnostic is disabled in Step 185 and Step 170 is executed. In Step 170, the results are reported and the diagnostic is ended in Step 175.

If the Large Leak History Fault is present in Step 180, the Warm Leak Test is called in Step 190 and Step 195 is executed. The Warm Leak Test of Step 195 is a designed to run when the vehicle is warm and the fuel may be volatile. It is designed to extinguish a malfunction indicator light and clear false faults that occur as a result of a gas cap not being properly replaced on a vehicle. The Warm Leak Test invokes the TANK mode in the purge logic in a similar manner to the Idle Large Leak Test of Step 135 described below. After the Warm Leak Test is run, proceed to Step 170 where the results are reported and the diagnostic is ended in Step 175.

Referring back to Step 120, where the vehicle is determined to be idling, or to Step 125, when the vehicle is not idling and the vehicle has not spent the allotted time in Preset Mode. Step 200 is executed. In Step 200, the Preset Large Leak Test in called. After Step 200, Step 205 is executed. In Step 205, a determination is made whether the Preset Large Leak Test is passed. The Preset Large Leak Test invokes TANK mode in the purge logic. Under real world conditions, the vehicle may not be at idle when the diagnostic test begins. In these conditions, the diagnostic begins purging from the tank to "preset" the system vacuum. The amount of purge is by the TANK mode. Then, the Preset Large Leak Test determines whether there is a large leak (greater than 0.04") in the evaporative system. It uses the same criteria as the Idle Large Leak Test described above in Step 130 with different predetermined vacuum threshold values. If the Preset Large Leak Test is passed, Step 100 is executed. If not, Step 170 is executed where the results are reported and the diagnostic is ended in Step 175. The details of Step 200 and 205 are described in copending U.S. application Ser. No. 09/438,068 and are incorporated by reference herein.

Figure 3:
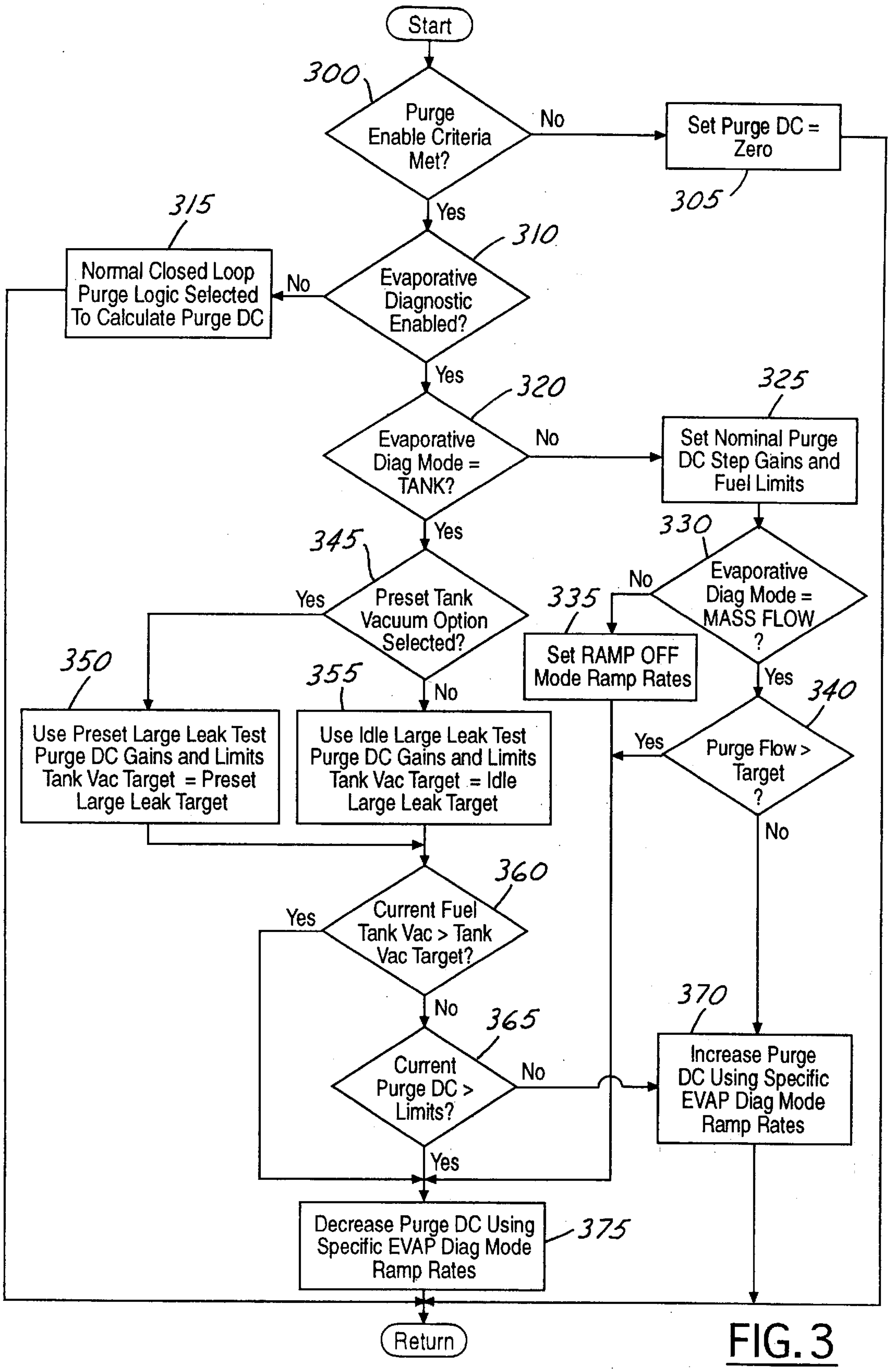
FIG. 3 is a logic flow diagram for determining an evaporative diagnostic purge duty cycle.

Referring now to FIG. 3, a logic flow diagram for determining an Evaporative Diagnostic Purge Duty Cycle Logic is illustrated.

The Purge Duty Cycle Logic determines the amount of time that the Purge Solenoid Valve 42 of FIG. 1 will be opened during a particular software frame. For a preferred embodiment of the present invention, the software frame lasts approximately 62.5 milliseconds. Thus, if the purge duty cycle value is set to 50%, the valve 42 will be opened for 31.25 milliseconds per software frame, if the value is 0% the valve is closed for the entire software frame. The purge duty cycle value may be determined as a function of engine intake airflow, and the value is limited by other engine parameters such as fuel pulse-width and purge duty cycle change rates. For each subroutine (TANK, MASSFLOW, or RAMPOFF), purge duty cycle gains and limits arc set by the subroutine. Each subroutine has different limits.

Step 300 determines whether the Purge enablement criteria are met similar to Step 105 of FIG. 2. If the criteria are met. Step 310 is executed. Step 310 determines if the Evaporative Diagnostic is enabled, similar to Step 100 of FIG. 2.

If the evaporative diagnostic is enabled in Step 310, then a determination is made in Step 320 whether the evaporative diagnostic mode is TANK MODE. TANK MODE modifies the purge logic to support aggressive purging requirements of the evaporative diagnostic during the Idle Large Leak Test of Step 105 in FIG. 2, the Preset Large Leak Test of Step 200 in FIG. 2, and the Warm Large Leak Test of Step 195 in FIG. 2. If the evaporative diagnostic mode is TANK mode, Step 345 determines whether or not the preset vacuum option is selected.

If the preset vacuum option is selected in Step 345, Step 350 uses the Preset Large Leak Test tank vacuum targets and purge duty cycle gains and limits to control the commanded puree duty cycle. After Step 350, Step 360 is executed. If the preset vacuum option is not selected in Step 345, Step 355 uses the Idle Large Leak Test tank vacuum targets and purge duty cycle gains and limits to control the commanded purge duty cycle. After Step 355, Step 360 is executed.

In Step 360, a determination is made as to whether the current fuel tank vacuum is greater than the tank vacuum target. If the tank vacuum is not greater than the tank vacuum target, Step 365 is executed. In Step 365, a determination is made as to whether the current purge duty cycle is greater than the allowable limits.

If the current tank vacuum is greater than the current tank vacuum targets in Step 360 or if the current purge duty cycle is greater than the allowable limits in Step 365, Step 375 is executed. In Step 375, the purge duty cycle using specific evaporative diagnostic test ramp rates is decreased.

If the current purge duty cycle is not greater than the allowable limits in Step 365, Step 370 is executed. In Step 370, the purge duty cycle using the specific evaporative diagnostic test ramp rates is increased.

Referring now to Step 300, if the purge enablement criteria are not met, Step 305 is executed. In Step 305, the purge duty cycle is set to 0%, wherein the purge solenoid valve 42 of FIG. 1 is closed for the entire software frame.

Referring now to Step 310, if the evaporative diagnostic is disabled, the normal closed loop purge logic is selected to calculate the purge duty cycle in Step 315.

Referring now to Step 320, if the evaporative diagnostic mode is not the TANK mode, Step 325 is executed. In Step 325, the nominal purge duty cycle step gains and fuel limits are set. After Step 325, Step 330 is executed.

In Step 330, a determination is made as the whether the evaporative diagnostic mode is MASS FLOW. If the evaporative diagnostic is MASS FLOW, Step 340 is executed. In Step 340, a determination is made as to whether purge flow is greater than a target value. If the purge flow is greater than the target value in Step 340, Step 375 is executed, wherein the purge duty cycle is decreased using specific evaporative diagnostic ramp rates.

Referring now to Step 330, if the evaporative diagnostic mode is not MASS FLOW, Step 335 is executed. In Step 335, RAMP OFF mode ramp rates are set. After Step 335, Step 375 is executed, wherein the purge duty cycle is decreased using specific evaporative diagnostic test ramp rates.

Referring now to Step 340, if the purge flow is not greater than a target value, Step 370 is executed, wherein the purge duty cycle is increased using specific evaporative diagnostic test ramp rates.

Figure 4:
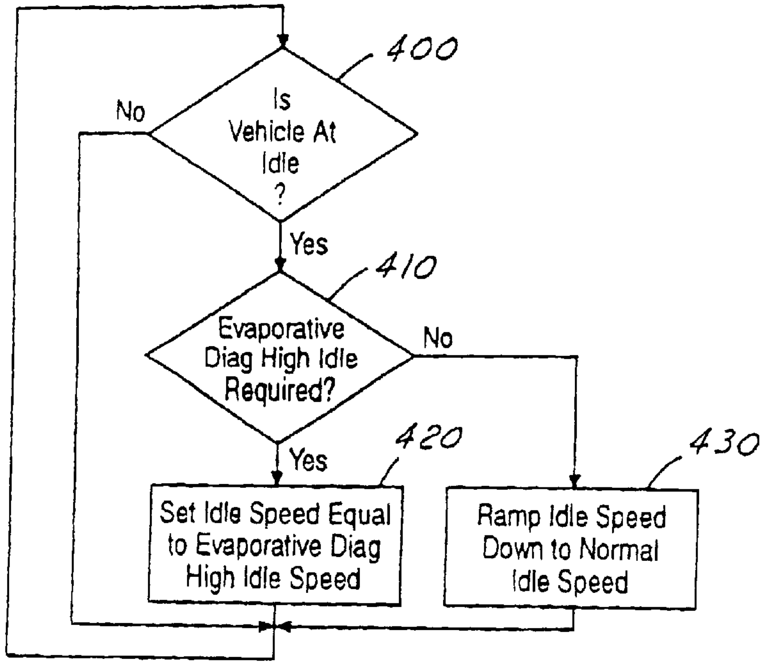
FIG. 4 is a logic flow diagram for increasing idle speed during RAMPOFF and TANK modes.

Referring now to FIG. 4, a logic flow diagram for increasing the engine idle speed during RAMP OFF and TANK modes is illustrated. The Evaporative Diagnostic Intrusive Idle Speed Override feature is called during the Purge Valve Leak Test, the Preset Large Leak Test, the Idle Large Leak Test, the Small and Very Small Leak Tests, and the Warm Large Leak Test in FIG. 3. This feature increases the idle speed during the specific evaporative diagnostic tests to avoid engine stumble and to accommodate more fuel vapor from purge and to enhance engine stability during high purge transients.

In FIG. 4, Step 400 determines whether the vehicle is at idle. If the vehicle was at idle in Step 400, Step 410 is executed. Step 410 determines whether the evaporative diagnostic high idle speed is required for the currently running test. High Idle is required where TANK mode or RAMP OFF mode is indicated. If the high idle is required, Step 420 is executed. Step 420 sets the idle speed equal to the evaporative diagnostic high idle speed.

Referring now to Step 400, if the vehicle is not at idle, the intrusive idle is not called.

Referring now to Step 410, if the high idle is not required, Step 430 is executed. In Step 430, the idle speed is ramped down to the normal idle speed.

Figure 5:
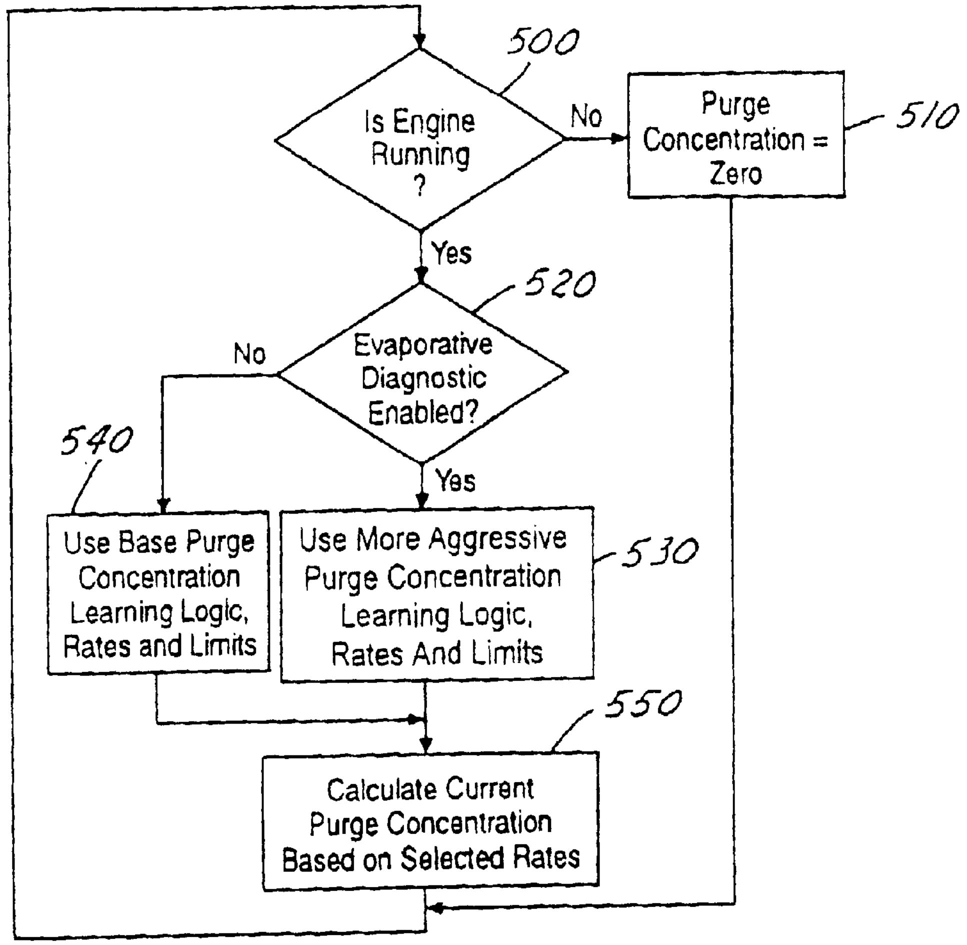
FIG. 5 is a logic flow diagram for the Purge Concentration Learning Logic used in the TANK mode, RAMPOFF mode and MASS FLOW mode.

FIG. 5 is a logic flow diagram for the Purge Concentration Learning Logic that is used in the TANK Mode, the RAMPOFF mode, and the MASS FLOW mode to aggressively learn the tank concentrations during the first tank draw. This is necessary to avoid engine stumble or stalls that may occur from improper engine fueling. Improper engine fueling occurs when the tank concentration is learned incorrectly. If the concentration is incorrect, the resulting engine fueling, caused by the purge transients required to support the various evaporative diagnostic tests, could be too rich or can to support stable compression. The increased gains and limits imposed by the TANK mode MASS FLOW mode, and RAMPOFF mode are designed to maintain proper fueling so that the evaporative diagnostic can operate inconspicuously.

In FIG. 5, Step 500 determines whether the engine is running. If the engine is idling, Step 520 is executed. In Step 520, it is determined whether the evaporative diagnostic is enabled as in Step 100 of FIG. 2. If the diagnostic is enabled, Step 530 is executed.

In Step 530, a more aggressive evaporative diagnostic purge concentration learning logic is selected. From Step 530, Step 550 calculates the current purge concentration using the more aggressive evaporative diagnostic rates and limits.

Referring now to Step 500, if the engine is not running, Step 510 is executed. In Step 510, the purge concentration is set to zero.

Referring now to Step 520, if the evaporative diagnostic is not enabled, Step 540 is executed. In Step 540, purge concentration learning rates and limits are set to the baseline (non-diagnostic rates and limits). From Step 540, Step 550 calculates the current purge concentration using baseline rates and limits.

While the invention has been described in terms of preferred embodiments, it will be understood, of course, that the invention is not limited thereto since modifications may be made by those skilled in the art particularly in light of the foregoing teachings.

What is claimed is:

1. A method for supporting diagnostics used to determine whether leaks or blockages are present in a fuel evaporative system comprising the steps of:

determining whether a series of global criterion are met for invoking at least one of a plurality of mutually exclusive modes of operation to coordinate intrusive control of a purge system, wherein said series of global enablement criterion are selected from the group consisting of acceptable fuel levels, acceptable coolant levels, acceptable intake temperature, acceptable coolant-intake delta temperature, acceptable tank hydrocarbon levels, and acceptable barometric pressure;

invoking said at least one of said plurality of mutually exclusive modes of operation when said series of global criterion are met; and invoking a normal closed loop purge logic when said series of global criterion are not met.

2. The method of claim 1, wherein the step of invoking said at least one of said plurality of mutually exclusive modes of operation when said series of global criterion are met comprises the step of invoking a RAMP OFF mode of operation when said series of global criterion are met.

3. The method of claim 1, wherein the step of invoking said at least one of said plurality of mutually exclusive modes of operation when said series of global criterion are met comprises the step of invoking a TANK mode of operation when said series of global criterion are met.

4. The method of claim 1, wherein the step of invoking said at least one of said plurality of mutually exclusive modes of operation when said series of global criterion are met comprises the step of invoking a MASS FLOW mode of operation when said series of global criterion are met.

* * * * *